US012750004B2

(12) United States Patent
Xu et al.

(10) Patent No.: US 12,750,004 B2
(45) Date of Patent: Sep. 29, 2026

(54) WAVE-RESISTANT PHOTOVOLTAIC (PV) FLOAT FOR WATER ENVIRONMENT, AND ASSEMBLING METHOD THEREOF

(71) Applicant: BioHaven Environmental Solutions (Zhejiang) Co., Ltd., Taizhou (CN)

(72) Inventors: Yunyou Xu, Taizhou (CN); Wenbo Liu, Taizhou (CN); Jingjing Wang, Taizhou (CN); Xin He, Taizhou (CN); Wenjing Qin, Taizhou (CN); Shuang Zheng, Taizhou (CN); Linhao Li, Taizhou (CN)

(73) Assignee: BioHaven Environmental Solutions (Zhejiang) Co., Ltd., Taizhou (CN)

( * ) Notice: Subject to any disclaimer, the term of this patent is extended or adjusted under 35 U.S.C. 154(b) by 0 days.

(21) Appl. No.: 19/014,529

(22) Filed: Jan. 9, 2025

(65) Prior Publication Data

US 2025/0150024 A1 May 8, 2025

Related U.S. Application Data

(63) Continuation of application No. PCT/CN2023/107960, filed on Jul. 18, 2023.

(30) Foreign Application Priority Data

Aug. 17, 2022 (CN) ......................... 202210989005.6
Aug. 17, 2022 (CN) ......................... 202222176832.1

(51) Int. Cl.
*H02S 20/30* (2014.01)
*B63B 35/44* (2006.01)
*B63B 75/00* (2020.01)

(52) U.S. Cl.
CPC .............. *H02S 20/30* (2014.12); *B63B 35/44* (2013.01); *B63B 75/00* (2020.01); *B63B 2035/4453* (2013.01)

(58) Field of Classification Search
CPC .......... H02S 20/30; H02S 10/00; H02S 20/00; B63B 35/44; B63B 75/00; B63B 2035/4453; Y02E 10/50
See application file for complete search history.

(56) References Cited

FOREIGN PATENT DOCUMENTS

| | | | | |
|---|---|---|---|---|
| CN | 207917097 U | | 9/2018 | |
| CN | 110239682 A | * | 9/2019 | ............ H02S 20/00 |
| CN | 209994308 U | | 1/2020 | |
| CN | 114872845 A | | 8/2022 | |
| CN | 218519812 U | | 2/2023 | |
| CN | 116198671 A | | 6/2023 | |
| KR | 101813573 B1 | | 1/2018 | |
| WO | 2022010373 A1 | | 1/2022 | |

* cited by examiner

*Primary Examiner* — Michael Y Sun

(57) ABSTRACT

A wave-resistant photovoltaic float used in a water environment, which includes multiple photovoltaic carriers and a photovoltaic module. The photovoltaic carrier includes an upper component and a lower component, which are integrally formed. The upper component is smaller than the lower component in terms of length and width. The lower component of the photovoltaic carrier is a flat-shaped floating structure. A hollow portion is provided in the middle of the lower component, and acts as a suction cup.

8 Claims, 12 Drawing Sheets

WAVE-RESISTANT PHOTOVOLTAIC (PV) FLOAT FOR WATER ENVIRONMENT, AND ASSEMBLING METHOD THEREOF

CROSS-REFERENCE TO RELATED APPLICATIONS

This application is a continuation of International Patent Application No. PCT/CN2023/107960, filed on Jul. 18, 2023, which claims the benefit of priority from Chinese Patent Applications No. 202210989005.6 and No. 202222176832.1, both filed on Aug. 17, 2022. The content of the aforementioned application, including any intervening amendments thereto, is incorporated herein by reference in its entirety.

TECHNICAL FIELD

This application relates to offshore photovoltaic (PV) technology, and more specifically to a wave-resistant PV float for a water environment and an assembling method thereof.

BACKGROUND

With the development of photovoltaic (PV) technology, photovoltaic devices have been systematically and extensively used in various fields. As environmental problems brought by the petroleum and petrochemical industries is increasingly prominent, more and more attention has been paid to the development of clean and green energy resources.

The PV devices have been widely deployed, especially in areas with low land cost, such as the Northwest region and inland lakes. Among them, the floating photovoltaic (FPV) has emerged as a promising technology for generating renewable energy since it does not occupy valuable land areas, and will not be affected by obstacles. Moreover, the FPV also has the advantages of high power generation and remarkable energy production, and is highly compatible with other industries. At present, the FPV has been extensively applied in large reservoirs, lakes and fish ponds in China.

At present, the FPV system applied in large freshwater reservoirs involves the connection of multiple floats, that is, a single PV assembly requires multiple PV carriers. The PV assemblies are connected through plastic components between the floats. However, such connection has high strength requirement for connectable parts after the connected part is damaged.

The ocean area is much larger than the land area, and thus the ocean has a brilliant development prospect. However, the frequency and intensity of wind and waves in the ocean are greater than those of inland areas. Affected by the wind and waves in the sea, the buoyancy and structural strength of the general photovoltaic carriers do not meet use requirements. Moreover, they are prone to damage and failure, thereby causing economic losses. Based on this, the present disclosure provides a floating photovoltaic carrier used in a saltwater environment to overcome the shortcomings of general offshore floating PVs.

SUMMARY

An objective of the present disclosure is to provide a wave-resistant photovoltaic float for a water environment, which includes a photovoltaic carrier and a photovoltaic module. The photovoltaic module is horizontally embedded into the photovoltaic carrier. The photovoltaic carrier includes an upper component and a lower component, which are integrally formed. The upper component is smaller than the lower component in terms of length and width. The lower component is a floating structure with a flat shape. The upper component is configured to install the photovoltaic module. A hollow portion is provided in the middle of the lower component, and acts as a suction cup. After the photovoltaic module is mounted on the photovoltaic carrier to form a closed structure, the hollow portion provided on the lower surface of the photovoltaic carrier makes the gas underneath the photovoltaic carrier be enclosed by the water surface, and the photovoltaic float is adherent to the water surface similarly as a suction cup under the combined effect of buoyancy and atmospheric pressure. For a region where the wind and waves are weak, a photovoltaic bracket can be mounted through four holes of the upper component to support the photovoltaic module, so that the photovoltaic module has a tilt angle to achieve the optimal power generation effect. Photovoltaic float units are connected by a steel cable, allowing for convenient disassembly and replacement.

In addition, when encountering water impact, the photovoltaic float can rotate around the steel cable within a certain range, which reduces the damage caused by the water impact and further improves the resistance to wind and waves. Furthermore, the photovoltaic float is easy to assemble and dismantle, reducing the time and labor consumption.

Technical solutions of the present disclosure are described below.

In a first aspect, this application provides a wave-resistant photovoltaic float for a water environment, comprising:

a plurality of photovoltaic carriers; and a photovoltaic module;

wherein each of the plurality of photovoltaic carriers comprises an upper component and a lower component, and the upper component and the lower component are integrally formed; the upper component and the lower component are each in a flat rectangular shape; and the upper component is located above a middle of the lower component; and a hollow portion is provided at the middle of the lower component, and is configured to run through the lower component.

In an embodiment, a length of the upper component is smaller than a length of the lower component, and a width of the upper component is smaller than a width of the lower component;

an upper surface of the lower component is configured to incline downwards towards an exterior of the lower component, and form an acute angle with a lower surface of the lower component; and the hollow portion is cylindrical, conical or cuboid.

In an embodiment, the hollow portion is cuboid.

In an embodiment, the length of the lower component is 100-300 mm larger than that of the upper component, and the width of the lower component is 100-300 mm larger than that of the upper component.

In an embodiment, the length of the lower component is 100-400 mm larger than that of the hollow portion, and the width of the lower component is 100-400 mm larger than that of the hollow portion.

In an embodiment, adjacent two of the plurality of photovoltaic carriers are connected in a removable manner.

In an embodiment, the adjacent two of the plurality of photovoltaic carriers are connected in a snap-fit connection, a sleeve connection or a combination thereof.

In an embodiment, the adjacent two photovoltaic carriers are connected in the sleeve connection.

In an embodiment, the adjacent two of the plurality of photovoltaic carriers are connected to through a steel cable; each of the plurality of photovoltaic carriers is sleeved on the steel cable through a connecting structure located around a periphery of the lower component; and each of the plurality of photovoltaic carriers is rotatable around a direction perpendicular to the steel cable.

In an embodiment, the periphery of the lower component is provided with a plurality of grooves; each of the plurality of grooves is provided with the connecting structure; the connecting structure is sleeved on the steel cable; and the connecting structure is integrally connected with the lower component.

In an embodiment, the periphery of lower component consists of two first sides and two second sides shorter than the two first sides;

- the number of grooves among the plurality of grooves on each of the two first sides of the lower component is 2-12;
- the grooves on each of the two first sides of the lower component are arranged evenly spaced apart at an interval of 400-700 mm;
- the number of grooves among the plurality of grooves on each of the two second sides of the lower component is 2-12; and
- the grooves on each of the two second sides of the lower component are arranged evenly spaced apart at an interval of 400-700 mm.

In an embodiment, the connecting structure comprises a stainless-steel sleeve and a connecting piece; a first side of the connecting piece is configured to be connected to the lower component of the photovoltaic carrier, and a second side opposite to the first side of the connecting piece is configured to be connected to the stainless-steel sleeve.

In a second aspect, this application provides a method of assembling a photovoltaic array, the photovoltaic array being assembled by a plurality of photovoltaic floats, each of the plurality of photovoltaic floats being the aforementioned wave-resistant photovoltaic float;

the method comprising:

- embedding the photovoltaic module into the plurality of photovoltaic carriers to obtain the wave-resistant photovoltaic float; and
- connecting a plurality of wave-resistant photovoltaic floats via a steel cable to obtain the photovoltaic array.

Figure 1:
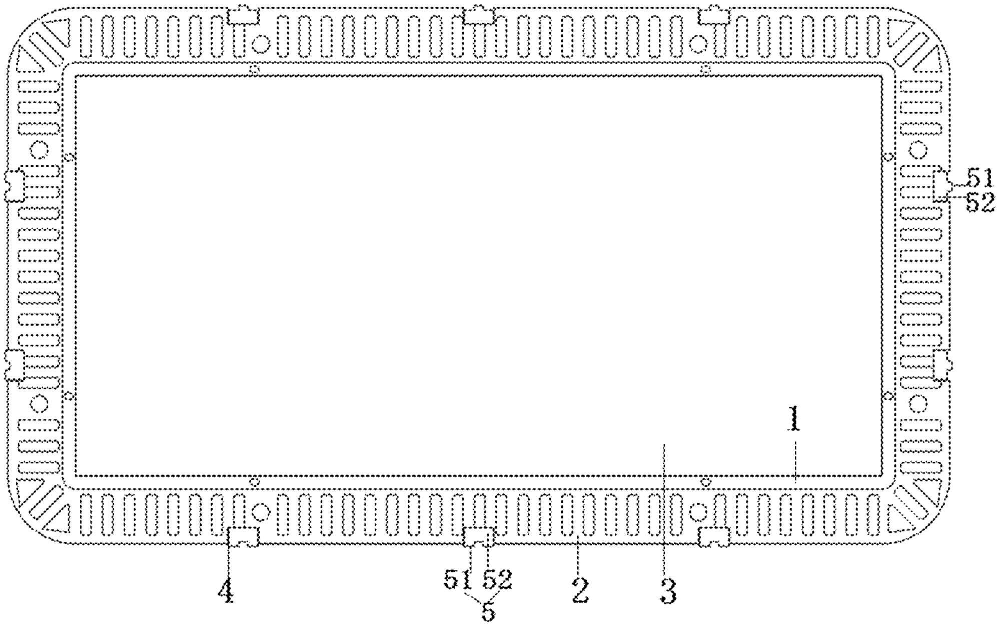
FIG. 1 is a top view of a photovoltaic carrier of a photovoltaic float used in a water environment according to an embodiment of the present disclosure.

In the drawings, 1, upper component; 2, lower component; 3, hollow portion; 4, groove; 5, connecting structure; 51, stainless-steel sleeve; and 52, connecting piece.

DETAILED DESCRIPTION OF EMBODIMENTS

The present disclosure will be described in detail below, and the features and advantages of the present disclosure will become clearer and more definite with these descriptions.

Figure 4:
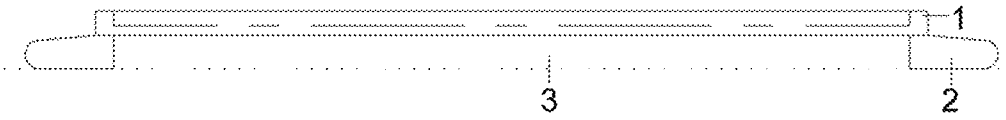
FIG. 4 is a cross-sectional view of the photovoltaic carrier used in the water environment according to an embodiment of the present disclosure.

In a first aspect, the present disclosure provides a wave-resistant photovoltaic float for a water environment, which includes a plurality of photovoltaic carriers and a photovoltaic module. Each of the plurality of photovoltaic carriers includes an upper component 1 and a lower component 2, and the upper component 1 and the lower component 2 are integrally formed. Both of the upper component 1 and the lower component 2 are in a flat rectangular shape. The upper component 1 is located above a middle of the lower component 2, as shown in FIGS. 1 and 4.

Figure 2:
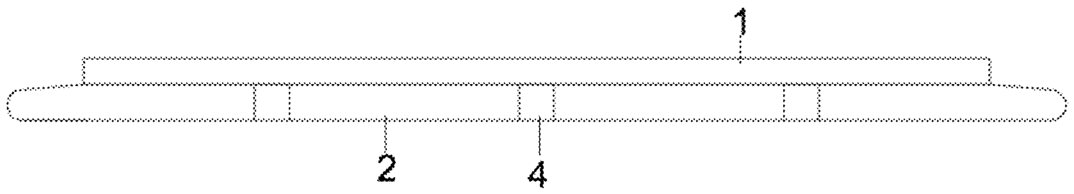
FIG. 2 is a front view of the photovoltaic carrier used in the water environment according to an embodiment of the present disclosure.
Figure 3:
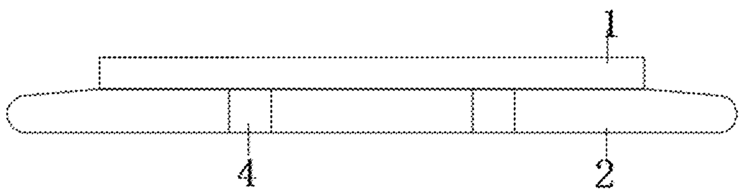
FIG. 3 is a left view of the photovoltaic carrier used in the water environment according to an embodiment of the present disclosure.

The length of the upper component 1 is smaller than the length of the lower component 2, and the width of the upper component 1 is smaller than the width of the lower component 2, as shown in FIGS. 2 and 3. The upper component is configured to place and fix the photovoltaic module. The lower component 2 of the photovoltaic carrier is a floating structure with a flat shape.

A hollow portion 3 is provided at a middle of the lower component 2. The photovoltaic carrier is generally in a solid structure except for the hollow portion. Preferably, the hollow portion 3 runs through the lower component 2, as shown in FIG. 4, and serves as a part of the suction cup structure of the photovoltaic carrier. When the photovoltaic module is arranged on the photovoltaic carrier in a horizontal manner, the photovoltaic module is spliced with the photovoltaic carrier to form a sealed structure. The lower surface of the photovoltaic carrier has a large area of depression, so that the gas below the photovoltaic carrier is closed by the water surface. In addition, under the co-effects of the buoyancy of the photovoltaic carrier on the water and the atmospheric pressure, the photovoltaic float can fit on the water surface like a suction cup. When the photovoltaic module and the photovoltaic carrier encounter a wind and wave, the buoyancy of the photovoltaic carrier makes the photovoltaic float not sink to the water, and the atmospheric pressure makes the photovoltaic float not detach from the water surface, so as to ensure the photovoltaic float to attach to the water surface, thereby effectively improving its resistance to a large wind and wave.

Preferably, the length of the lower component 2 is 100-300 mm larger than that of the upper component 1, and more preferably, the length of the lower component 2 is 150-200 mm larger than that of the upper component 1.

Preferably, the width of the lower component 2 is 100-300 mm larger than that of the upper component 1, and more preferably, the width of the lower component 2 is 150-200 mm larger than that of the upper component 1.

When the dimensions of the lower component 2 and the upper component 1 are in the above ranges, the lower component can provide sufficient buoyancy as a floating structure.

In an embodiment, the hollow portion 3 is cylindrical, conical or cuboid, preferably, cuboid.

The length of the lower component 2 is 100-400 mm larger than that of the hollow portion 3, preferably the length of the lower component 2 is 200-350 mm larger than that of the hollow portion 3.

The width of the lower component 2 is 100-400 mm larger than that of the hollow portion 3, preferably the width of the lower component 2 is 200-350 mm larger than that of the hollow portion 3.

If the size of the hollow portion is too large, the buoyancy provided by the lower component is insufficient to support the photovoltaic carrier and the photovoltaic module. If the size of the hollow portion is too small, the suction force provided by the hollow component is insufficient, thereby rendering a poor adhesion effect of the photovoltaic carrier to the water surface. If the size of the hollow portion is in the above-mentioned range, the hollow portion can provide sufficient suction force to make the photovoltaic carrier adhere to the water surface, and at the same time, the buoyancy provided by the lower component is larger. In this case, the hollow portion and the lower component synergistically improve the wind and wave resistance of the photovoltaic carrier.

In an embodiment, an upper surface of the lower component 2 of the photovoltaic carrier is provided with a stripe-like or water ripple-like pattern, as shown in FIG. 1, which serves as an anti-slip structure for the staff to walk on and at the same time can be used as a drainage structure.

Figure 11:
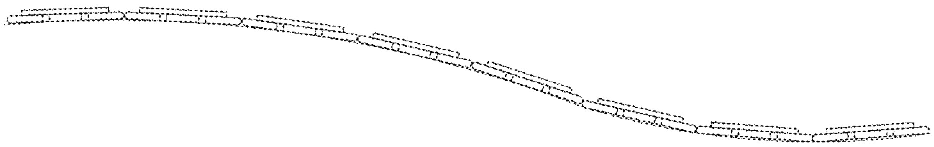
FIG. 11 schematically illustrates a photovoltaic array oscillating with waves in the water environment according to an embodiment of the present disclosure.
Figure 12:
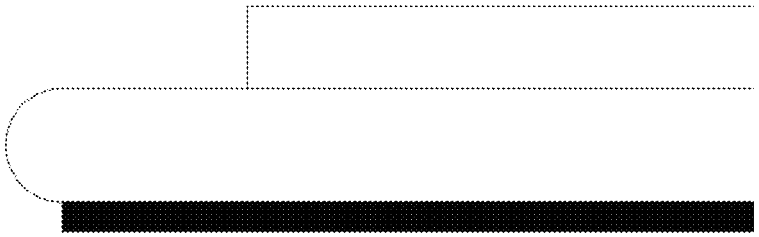
FIG. 12 schematically illustrates a bottom of the photovoltaic array according to an embodiment of the present disclosure.

In an embodiment, an absorbent layer of 1-5 cm exists below the photovoltaic float, as shown in FIGS. 11 and 12. When the photovoltaic floats horizontally on the water surface, the absorbent layer does not affect the buoyancy of the photovoltaic float. When the wind and waves are large to cause the photovoltaic float to turn over and raise one side of the photovoltaic float away from the water surface, the weight of the water in the absorbent layer affects the photovoltaic float, thereby resisting the wind force by the gravity of the water. The profile of the edge of the lower component 2 is arc, which can reduce the impact of the water current, thereby preventing the collision between photovoltaic carriers to cause the damage, and at the same time facilitating the opening and closing between the photovoltaic carriers.

The photovoltaic carriers are connected in a removable manner, preferably, in a snap-fit connection, a sleeve connection or a combination thereof, and more preferably, a sleeve connection.

The photovoltaic carriers in the present disclosure are not directly connected and fixed to each other. Adjacent two photovoltaic carriers are connected to through a steel cable. Specifically, the photovoltaic carriers are sleeved on the steel cable through a connecting structure 5 located around the periphery of the lower component 2, so that a plurality of photovoltaic carriers are connected to each other to form a photovoltaic array, and the adjacent photovoltaic carriers are rotatable around the direction perpendicular to the steel cable.

The above connection way can make adjacent photovoltaic carriers to rotate around the steel cable within a certain range when the photovoltaic carrier and the photovoltaic module are subject to water current impact, thereby reducing the damage caused by the water current impact to the photovoltaic carrier and the photovoltaic module and the connecting structure.

In an embodiment, a periphery of the lower component 2 of the photovoltaic carrier is provided with grooves 4, and each of the grooves 4 is provided with a connecting structure 5. The connecting structure 5 is sleeved on the steel cable, and is configured for the interconnection between the photovoltaic carrier. The connecting structure 5 and the lower component 2 of the photovoltaic carrier are integrally connected, as shown in FIG. 1.

The one-piece connection can provide a more effective force effect of the connecting structure 5, avoiding the breakage of the connecting structure 5 and improving the tolerance of the photovoltaic carriers and the resistance to wind and waves.

The number of grooves 4 on the long side of the lower component 2 of the photovoltaic carrier is preferably 2-12, more preferably, 3-12.

The distance between adjacent grooves 4 on the long side of the lower component 2 is equal, and the distance between adjacent grooves 4 on the long side is 400-700 mm, preferably 500-600 mm, more preferably 550 mm.

The number of grooves 4 on the short side of the lower component 2 of the photovoltaic carrier is preferably 2-12, more preferably, 3-12.

It can effectively connect adjacent photovoltaic carriers and provide sufficient connecting force, thereby avoiding disconnection between adjacent photovoltaic carriers due to insufficient connecting force when the wind and waves are large.

The distance between adjacent grooves 4 in the short side of the lower component 2 is equal, and the distance between adjacent grooves 4 in the short side is 400-700 mm, preferably 500-600 mm, more preferably 550 mm.

In an embodiment, the connecting structure 5 includes a stainless-steel sleeve 51 and a connecting piece 52. A first side of the connecting piece 52 connects the lower component 2 of the photovoltaic carrier, and a second side opposite to the first side of the connecting piece 52 connects the stainless-steel sleeve 51. The photovoltaic carrier is sleeved on a steel cable through the stainless-steel sleeve 51, as shown in FIG. 5.

The stainless-steel sleeve used herein for mounting can avoid the wear and tear on the connecting structure caused by the steel cable, thereby prolonging the service life.

Preferably, each connecting structure 5 includes one or two stainless-steel sleeves 51. When the connecting structure 5 includes two stainless-steel sleeves 51, the two stainless-steel sleeves are respectively located at two ends of the connecting piece 52, and the connecting structure 5 is in a concave shape. When the connecting structure 5 includes one stainless-steel sleeve 51, the stainless-steel sleeve is located in the middle of the connecting piece 52, and the connecting structure 5 is in a convex shape. The convex-shaped connecting structure may be embedded in the concave-shaped connecting structure, as illustrated in FIGS. 5 and 6.

Figure 5:
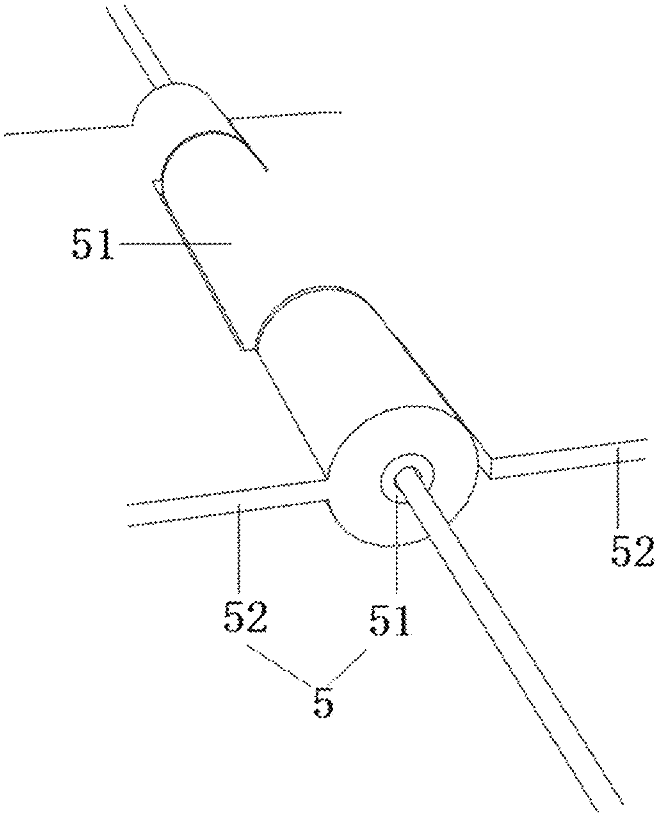
FIG. 5 schematically illustrates a connection between photovoltaic floats used in the water environment according to an embodiment of the present disclosure.
Figure 6:
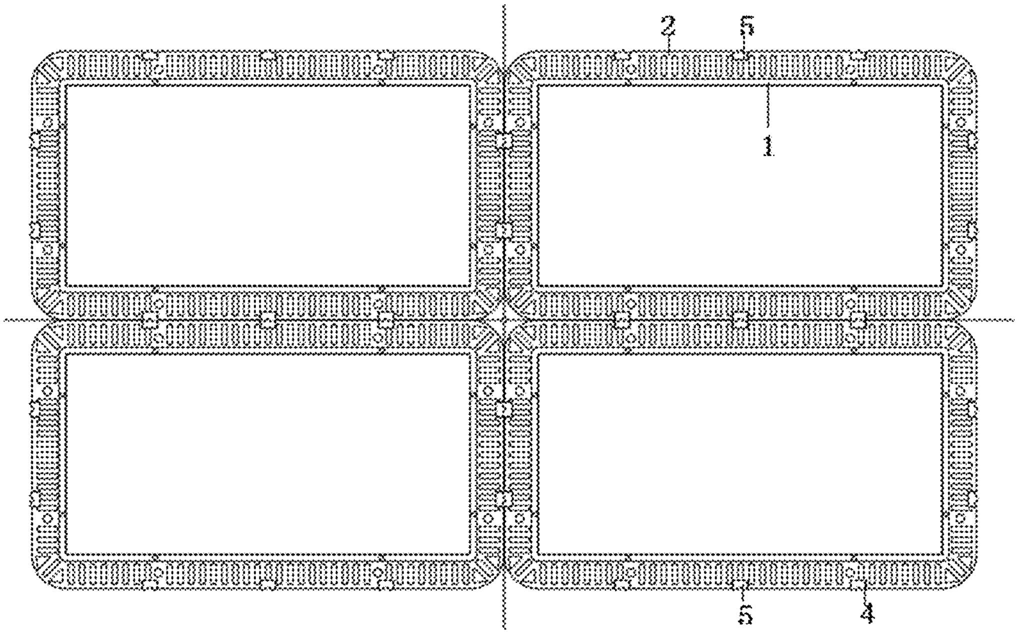
FIG. 6 is a top view of the connection between the photovoltaic floats used in the water environment according to an embodiment of the present disclosure.
Figure 7:
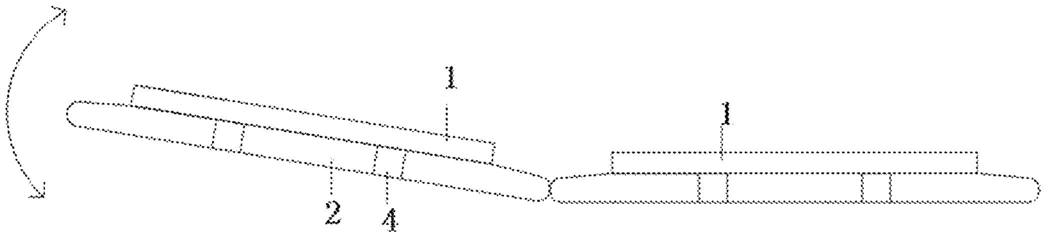
FIG. 7 is a left view of the connection between the photovoltaic floats used in the water environment according to an embodiment of the present disclosure.

More preferably, adjacent two sides of the lower component 2 are all provided with concave-shaped connecting structures, and the other two sides of the lower component 2 are all provided with convex-shaped connecting structures, such that the concave-shaped connecting structure and the convex-shaped connecting structure of adjacent photovoltaic carriers are embedded and sleeved on the steel cable to form a hinge-like structure, as shown in FIG. 5. When encountering wind and waves, the photovoltaic carriers can rotate along the vertical direction of the steel cable. As shown in FIG. 7, such embedded structure can also avoid the relative displacement between adjacent photovoltaic carriers along the axial direction of the steel cable and oscillate with the wind and waves, when encountering wind and waves, as shown in FIG. 11.

The above connection way used herein can enable the photovoltaic floating array in the water environment to rotate along the vertical direction of the steel cable within a certain range when it is impacted by the water current, thereby reducing the damage to the photovoltaic carrier and its connecting component caused by the water current impact.

The photovoltaic carrier is made of polymer, which mainly provides buoyancy and strength and combines the internal skeleton of the photovoltaic carrier and connecting members into a one-piece structure. The photovoltaic carrier is a solid core floating body to resist the impact of sea ice.

The polymer has a tensile strength higher than 0.4 MPa, preferably, higher than 15 MPa. The polymer is also corrosion-resistant to avoid chemical corrosion, biological corrosion and electrochemical corrosion in the marine environment. Furthermore, the polymer has a certain degree of elasticity to withstand the dynamic load caused by the impact of waves.

Figure 8:
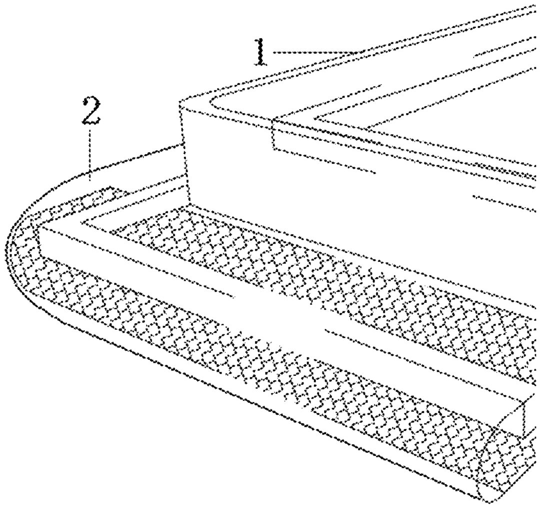
FIG. 8 schematically illustrates an internal structure of a photovoltaic float used in the water environment according to an embodiment of the present disclosure.

Both of the upper component 1 and the lower component 2 are provided with an internal skeleton support. The internal skeleton support is a rectangular bracket, as shown in FIG. 8, which is used as a support part and the internal skeleton for the production and molding of the photovoltaic carrier. A fiber mesh structure is provided around the periphery of the rectangular bracket of the lower component 2 for reinforcement, as shown in FIG. 8, which effectively improves the strength of the lower component 2 and the entire photovoltaic float, thereby improving the ability to withstand wind and waves. The internal support structure may be made of wood or Moso bamboo.

The overall buoyancy of the photovoltaic carrier in the water environment is much greater than the weight of the photovoltaic module. In the present disclosure, the buoyancy of the photovoltaic carrier is higher than 200 kg/block, which satisfies the damage requirements of the floating body material and the growth requirements of the marine fouling organisms.

In an embodiment, in a region with high wind and waves, such as the sea, the photovoltaic modules are embedded in a photovoltaic carrier, and the photovoltaic modules are mounted in the photovoltaic carrier in a horizontal manner. The horizontal mounting reduces the effect of wind and waves on the photovoltaic modules.

Figure 10:
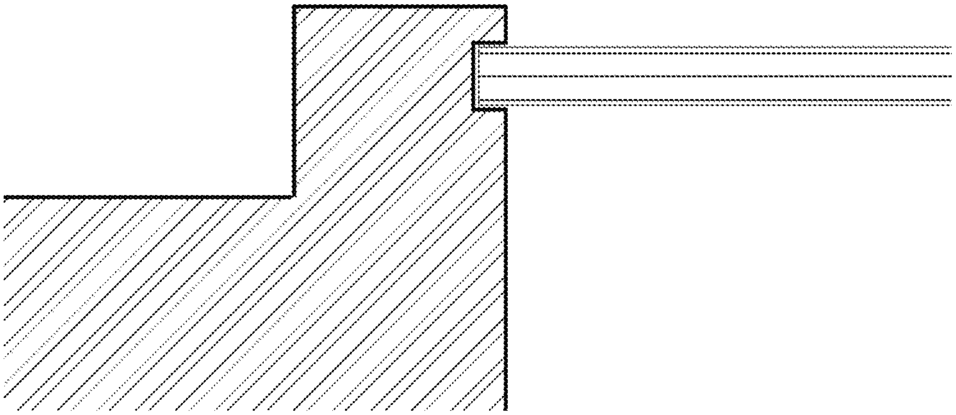
FIG. 10 schematically illustrates a horizontal installation of the photovoltaic module according to an embodiment of the present disclosure.

Specifically, the inner wall of the upper component 1 is provided with a circle of grooves, the height of which is slightly larger than the thickness of the photovoltaic module to ensure that the photovoltaic module can be embedded in the groove, as shown in FIG. 10.

In an embodiment, the photovoltaic module is mounted on the photovoltaic carrier at a certain tilted angle if it is installed in an area with less wind and waves, such as an inland lake.

Figure 9:
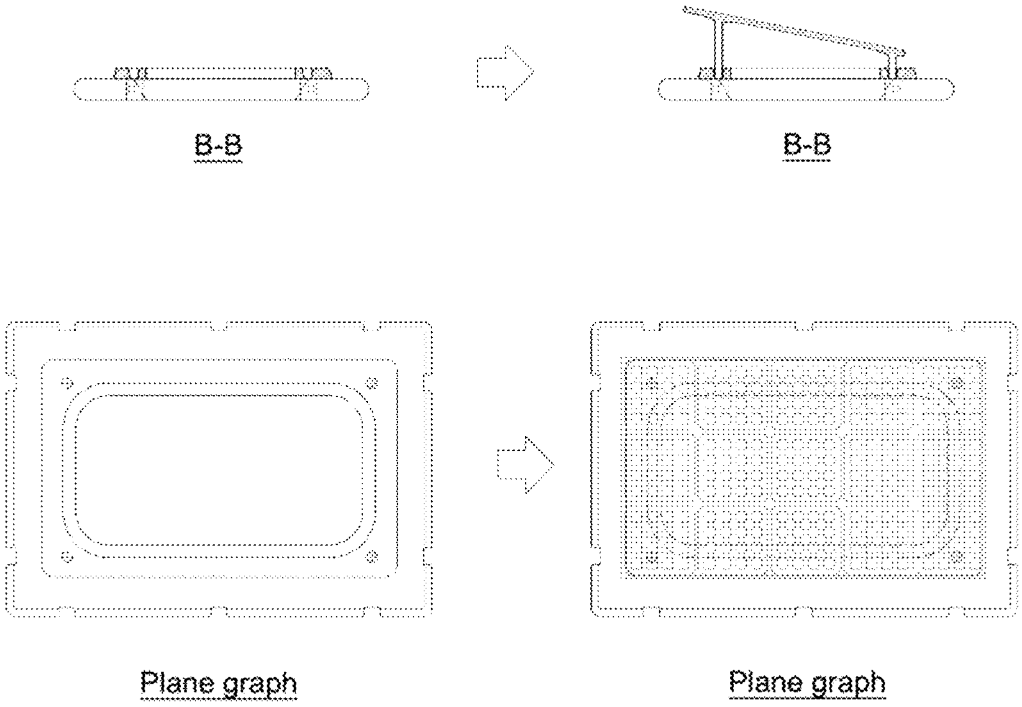
FIG. 9 schematically illustrates an installation of a photovoltaic module in a freshwater environment according to an embodiment of the present disclosure.

Specifically, four corners of the upper component 2 of the photovoltaic carrier are each provided with a hole, and the four holes are symmetrical, which are used for mounting the photovoltaic bracket. The photovoltaic modules are mounted on the photovoltaic bracket. As shown in FIG. 9, the photovoltaic brackets mounted on the same side have the same length, and the length of the photovoltaic bracket located on the same side is different from the length of the photovoltaic bracket located on the other side opposite thereto, so that the photovoltaic module is mounted on the photovoltaic carrier at a certain tilted angle, thereby achieving the optimal power generation.

In a second aspect, this application provides a method of assembling a photovoltaic array. The photovoltaic array is obtained by assembling the aforementioned wave-resistant photovoltaic floats. The method includes the following steps.

(1) A photovoltaic module is embedded in a photovoltaic carrier to obtain a photovoltaic float.

When the photovoltaic module is mounted in the photovoltaic carrier at a horizontal angle, the photovoltaic module is embedded in a groove of an inner wall of the upper component 1 to obtain a photovoltaic unit.

When the photovoltaic module is mounted in the photovoltaic carrier at a certain tilted angle, four photovoltaic brackets are respectively mounted in four holes of the upper component 2, where the length of the photovoltaic bracket mounted on the same side is different from the length of the photovoltaic bracket on the other side opposite thereto.

(2) Photovoltaic floats are connected via a steel cable to obtain a photovoltaic array.

The convex-shaped connecting structures in the lower component 2 of the adjacent photovoltaic floats are embedded into the concave-shaped connection structures, and a steel cable passes through the stain-less sleeve of each connecting structure to form a hinge-like structure, as shown in FIG. 5. The photovoltaic floats are connected using the above method, as shown in FIG. 6.

The photovoltaic floats are sleeved on the steel cable by a connecting structure in the lower component 2 of the photovoltaic carrier, so that a plurality of offshore photovoltaic floats are connected together to form an array, i.e., an offshore photovoltaic array.

The present disclosure has at least the following beneficial effects.

(1) In the present disclosure, the photovoltaic carrier and the photovoltaic float are spliced into a closed structure, the lower surface of the overall structure has a large area of concave structure, so that the gas below the water surface is sealed by the water surface. Under the co-action of the buoyant force of the photovoltaic carrier on the water and the atmospheric pressure, a one-piece suction structure is formed. In this case, the photovoltaic carrier is adherent to the water surface like a suction cup. When photovoltaic modules and the floats encounter the wind and wave, the buoyant force of the photovoltaic carrier makes the float to not sink into the water, and the atmospheric pressure makes the whole device to not detach from the water surface, so as to realize the adhesion effect to the water surface, thereby enhancing the resistance of the photovoltaic carrier to wind and wave.

(2) The photovoltaic float of the present disclosure is assembled by a photovoltaic carrier and a photovoltaic module corresponding thereto. If one photovoltaic carrier or photovoltaic module is damaged, it can be individually disassembled and replaced, avoiding the complex replacement of the overall installation method.

(3) The water environment photovoltaic float described in the present invention is easy and quick to install in one piece, and the laying efficiency is high, distinguishing it from the traditional water floating photovoltaic carriers that require multiple connecting points, and the disadvantage of difficult splicing of multiple pieces.

(4) The overall structure of the photovoltaic float in the water environment described in the present disclosure is solid, solving the problem that the floating photovoltaic carrier cannot work normally in the severe sea environment.

(5) The photovoltaic float of the present disclosure is different from the traditional float spliced by empty boxes. Specifically, the photovoltaic float of the present disclosure has a one-piece carrier structure, and mesh fibers are built in the photovoltaic carrier, which strengthens the fixing support, and has a good anti-wind and -wave effect, thereby realizing the building of the photovoltaic power station.

(6) In the present disclosure, photovoltaic floating units are connected via a steel cable. The photovoltaic floats can rotate along the vertical direction of the steel cable when impacted by the water current, which can effectively reduce the damage to the photovoltaic float and the connecting structure caused by the impact of the water current, thereby prolonging the service life of the photovoltaic float.

It is to be noted that as used herein, the terms, such as "upper", "lower", "inner", "outer", "front", and "back", indicate an orientation or positional relationship in the working state of the present disclosure, which are used only for the purpose of facilitating and simplifying the description, and are not intended to indicate or imply that the device or element referred to has to have a specific orientation or be constructed and operated in a specific orientation, and therefore are not to be construed as limitations of the present disclosure. Furthermore, the terms "first", "second", "third", "fourth" are merely used for descriptive purposes and are not to be understood as indicating or implying relative importance.

In the description of the present disclosure, it is to be noted that, unless otherwise expressly specified and limited, the terms "mounted", "connection" and "connecting" should be understood in a broad sense. For example, the term "connection" may be a fixed connection, a detachable connection or a one-piece connection in general; or may be a mechanical connection or an electrical connection; or may be a direct connection or an indirect connection through an intermediate medium; or may be a connection within two elements. For those of ordinary skill in the art, the specific meaning of the above terms may be understood in specific cases.

The present disclosure has been described above with reference to preferred embodiments, and these embodiments are merely exemplary and illustrative. Though the disclosure has been described in detail above, those skilled in the art can still make various variations, replacements and improvements to the features recited in the embodiments. It should be understood that those variations, replacements and improvements made without departing from the spirit of the disclosure shall fall within the scope of the present disclosure defined by the appended claims.

What is claimed is:

1. A wave-resistant photovoltaic float for a water environment, comprising:

a plurality of photovoltaic carriers; and a photovoltaic module;

wherein each of the plurality of photovoltaic carriers comprises an upper component and a lower component, and the upper component and the lower component are integrally formed; the upper component and the lower component are each in a flat rectangular shape; and the upper component is located above a middle of the lower component;

a hollow portion is provided at the middle of the lower component, and is configured to run through the lower component; and adjacent two of the plurality of photovoltaic carriers are connected through a steel cable; each of the plurality of photovoltaic carriers is sleeved on the steel cable through a connecting structure located around a periphery of the lower component;

and each of the plurality of photovoltaic carriers is rotatable around a direction perpendicular to the steel cable.

2. The wave-resistant photovoltaic float of claim 1, wherein a length of the upper component is smaller than a length of the lower component, and a width of the upper component is smaller than a width of the lower component;

an upper surface of the lower component is configured to incline downwards towards an exterior of the lower component, and form an acute angle with a lower surface of the lower component; and the hollow portion is cylindrical, conical or cuboid.

3. The wave-resistant photovoltaic float of claim 2, wherein the hollow portion is cuboid.

4. The wave-resistant photovoltaic float of claim 2, wherein the length of the lower component is 100-300 mm larger than that of the upper component, and the width of the lower component is 100-300 mm larger than that of the upper component.

5. The wave-resistant photovoltaic float of claim 2, wherein the length of the lower component is 100-400 mm larger than that of the hollow portion, and the width of the lower component is 100-400 mm larger than that of the hollow portion.

6. The wave-resistant photovoltaic float of claim 1, wherein the periphery of the lower component is provided with a plurality of grooves; each of the plurality of grooves is provided with the connecting structure; the connecting structure is sleeved on the steel cable; and the connecting structure is integrally connected with the lower component.

7. The wave-resistant photovoltaic float of claim 6, wherein the periphery of lower component consists of two first sides and two second sides shorter than the two first sides;

the number of grooves among the plurality of grooves on each of the two first sides of the lower component is 2-12;

the grooves on each of the two first sides of the lower component are arranged evenly spaced apart at an interval of 400-700 mm;

the number of grooves among the plurality of grooves on each of the two second sides of the lower component is 2-12; and the grooves on each of the two second sides of the lower component are arranged evenly spaced apart at an interval of 400-700 mm.

8. The wave-resistant photovoltaic float of claim 1, wherein the connecting structure comprises a stainless-steel sleeve and a connecting piece; a first side of the connecting piece is configured to be connected to the lower component, and a second side opposite to the first side of the connecting piece is configured to be connected to the stainless-steel sleeve.

* * * * *